United States Patent [19]

Schaefer et al.

[11] Patent Number: 4,470,643
[45] Date of Patent: Sep. 11, 1984

[54] BALL BEARING AND RETAINER THEREFOR

[75] Inventors: George H. Schaefer, Wauwatosa; Stephen P. Hirsch, North Prairie, both of Wis.

[73] Assignee: Realist, Inc., Menomonee Falls, Wis.

[21] Appl. No.: 369,581

[22] Filed: Apr. 19, 1982

[51] Int. Cl.³ .............................................. F16C 29/04
[52] U.S. Cl. .................................................. 308/6 R
[58] Field of Search .............. 308/3 R, 6 R, 6 B, 6 C, 308/201, 217, 3 A

[56] References Cited

U.S. PATENT DOCUMENTS 2,665,958  1/1954  Waldherr, Jr. ...................... 308/201
3,719,979  3/1973  Irwin .............................. 308/6 C X
4,296,974  10/1981 Teramachi ....................... 308/6 R X
4,334,717  6/1982  Polidor .............................. 308/6 R Primary Examiner—Stuart S. Levy
Assistant Examiner—David Werner
Attorney, Agent, or Firm—Bayard H. Michael

[57] ABSTRACT

Each embodiment has a linear bearing member having a ball retainer captured in the member to retain the ball bearings when the opposing bearing member is removed from the assembly. In one embodiment the opposing member has a race resting on the balls. In the other embodiment the first member has upper and lower races and the retainer holds ball bearings against each while the opposing bearing member fits between the upper and lower balls and has upper and lower races cooperating with the balls so the opposing member can be loaded upwardly or downwardly and still run on balls.

3 Claims, 4 Drawing Figures

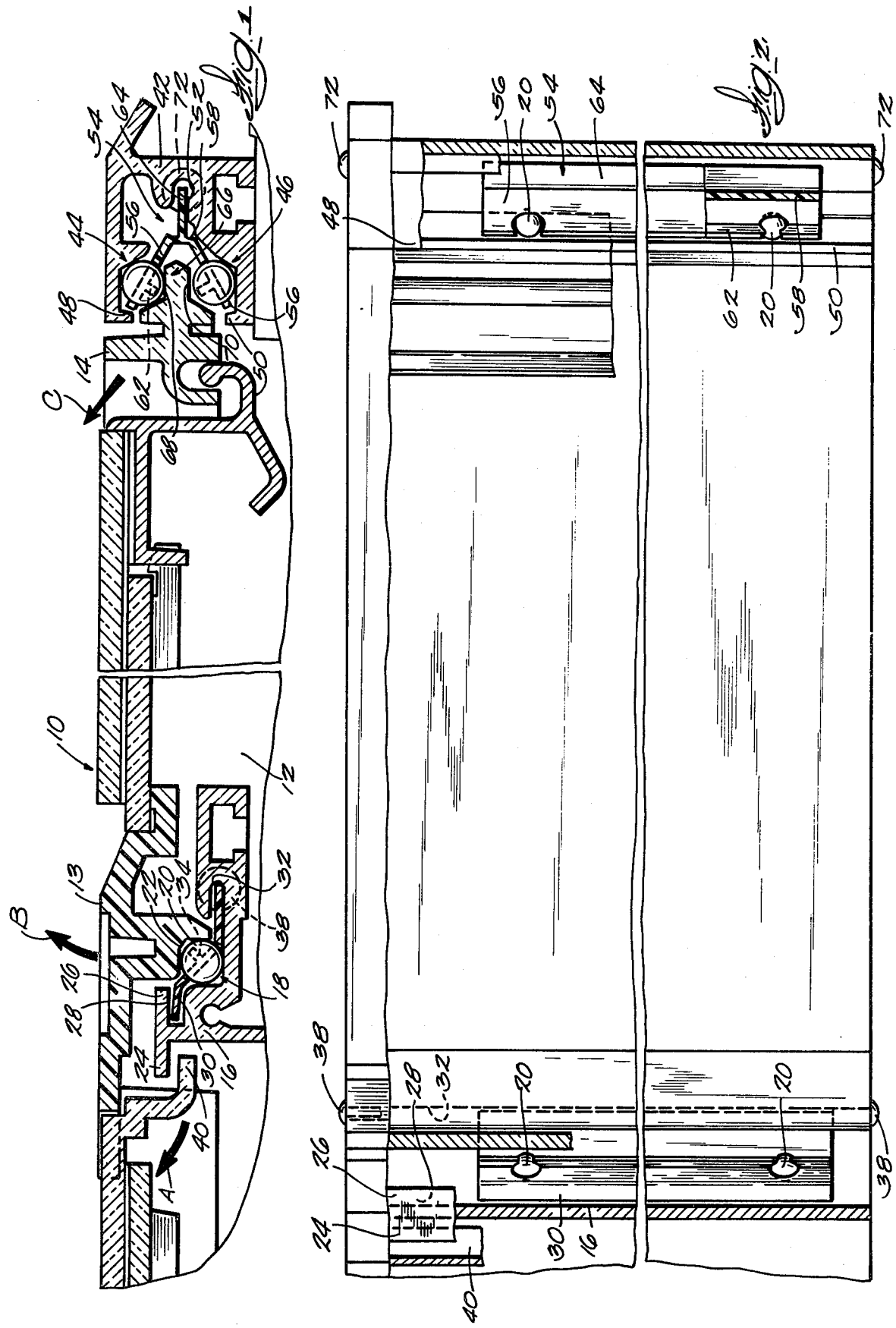

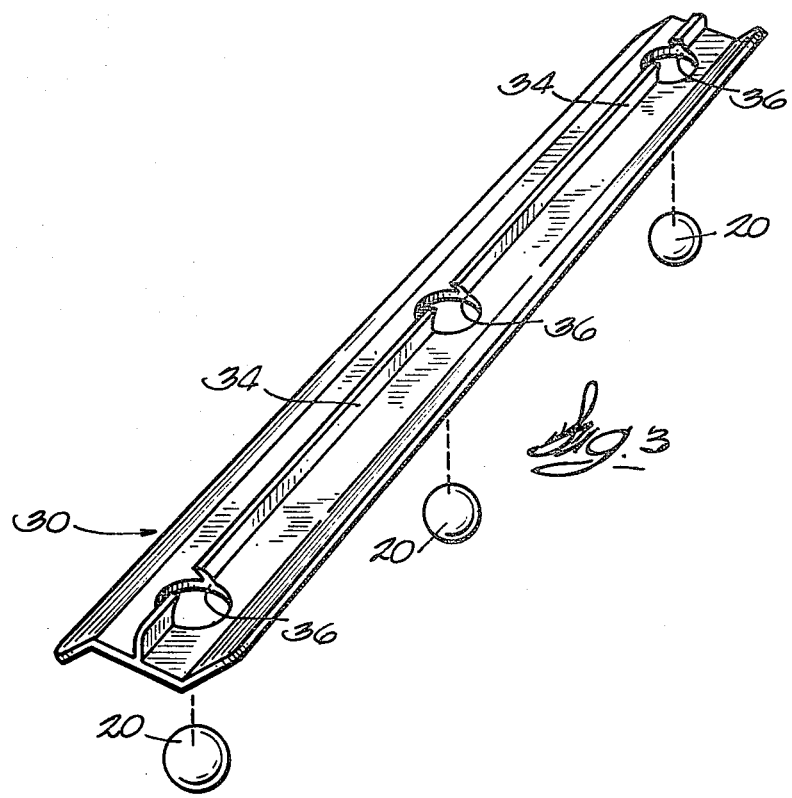
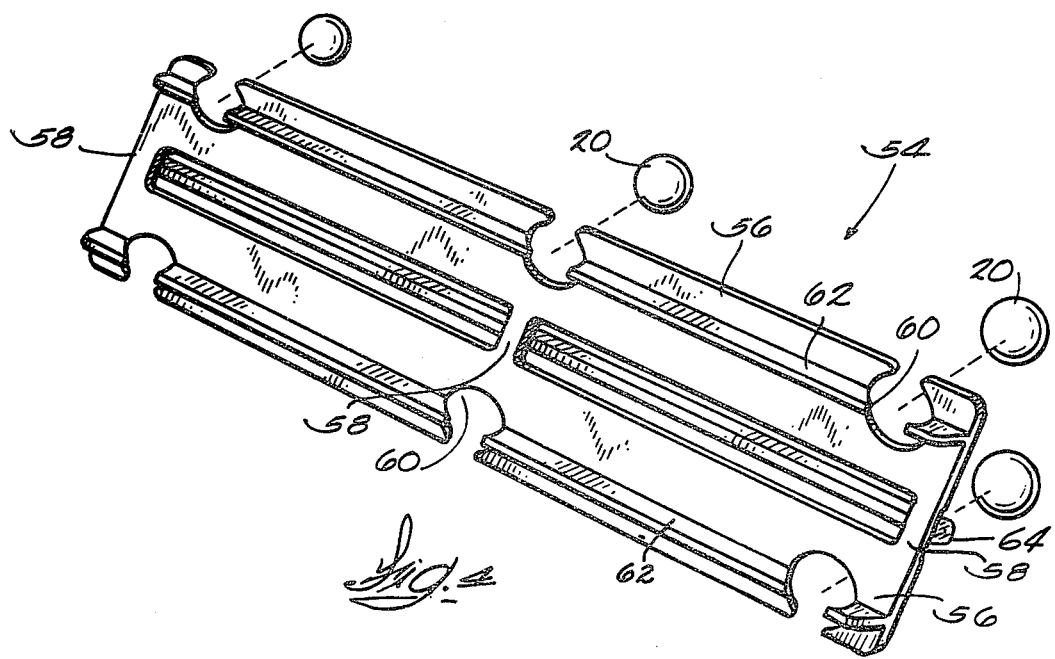

BALL BEARING AND RETAINER THEREFOR

BACKGROUND OF THE INVENTION

The fiche carrier in a microfiche reader is preferably separable from the subcarrier. This requires the use of bearings which can be taken apart. Bearings that meet this requirement generally have a fairly high resistance to movement and this is at odds with the desired smooth or silky movement of the carrier. To get that movement it would be desirable to use ball bearings and thereby minimize friction.

SUMMARY OF THE INVENTION

The object of this invention is to provide a ball bearing assembly and a ball retainer therefor which retains the balls relative to the bearing race when the opposing bearing race is removed. Another object of this invention is to fabricate such a ball retainer out of low cost plastic material which has high lubricity. Still another object of the invention is to provide a ball bearing assembly which requires only a few balls to accomplish the job.

BRIEF DESCRIPTION OF THE DRAWINGS

FIG. 1 is a section through a portion of a microfiche carrier provided with two bearing embodiments according to this invention.

FIG. 2 is a plan view of the construction shown in FIG. 1.

FIG. 3 is a partial exploded perspective view of one retainer in the form in which it is molded and the ball which would be retained by the retainer.

FIG. 4 is an exploded perspective showing the molded form of the second embodiment of the invention.

DETAILED DESCRIPTION OF THE DRAWINGS

FIGS. 1 and 2 illustrate a microfiche carrier 10 which is mounted on a subcarrier 12. The subcarrier is mounted on bearings (not shown) similar to the bearings at the right in FIG. 1 but extending from left to right in FIG. 1 instead of perpendicular to the page. The carrier has a frame including a medial cross member 13 and a rear cross member 14 which are rigid with respect to the sides of the frame. The subcarrier 12 includes a forward rail 16 provided with a race 18 having a horizontal surface and a vertical surface on which the balls 20 can roll. The carrier cross member 13 has a complimentary race 22 which also engages the ball 20. The top of the rail 16 is T-shaped to provide an arm 24 projecting to the left and another arm 26 projecting to the right. The arm 26 is spaced from the main part of the rail to provide a longitudinal groove 28 receiving a longitudinal edge of ball retainer 30. The rail extends to the right of the bearing race portion and is provided with a longitudinal slot 32 receiving the other edge of ball retainer 30. Thus, both edges of the retainer 30 are captured in the rail 16. The rail 16 is an extruded part and the ends of the slots are initially open.

The retainer 30 is molded as shown in FIG. 3 and has a longitudinal rib 34 extending the length of the retainer but interrupted at the ball receiving holes 36. At each hole the ends of the rib on each side of the hole project over the ball to prevent escape of the ball once it is captured between the retainer and the race 18. In order to mount the retainer in the rail, the retainer is slipped into the end of the rail with the balls captured as aforesaid. When so mounted the retainer cannot come loose and therefore the balls cannot escape. The retainer is held in the rail by threading screw 38 in each end of the rail slot 32.

With this arrangement the balls need not be placed side by side but can have considerable distance between the balls and still provide adequate support and function. The balls are preferably Nylon, and the retainer is advantageously molded polyethylene which has high lubricity. The retainer is shorter than the rail and is allowed to "float" or slide along the length of the rail. If not free to slide then the balls could not roll.

It will be obvious on inspecting the linear bearing assembly just described that the assembly can be readily separated vertically without loss of the balls. The balls will stay assembled relative to the race in the rail by reason of being captured by the retainer. In the microfiche carrier environment this would not be desirable in normal use. Therefore, means are provided for latching the carrier relative to the subcarrier by means of the latch hook 40 engaging the underside of arm 24 projecting from the rail. When the latch is moved in the direction of the arrow A in FIG. 1 the carrier is no longer latched to the subcarrier and can be moved upwardly in the direction of arrow B about a pivot point determined by the rear bearing assembly now to be described.

The rear rail 42 is also an extruded part and is carried by the subcarrier 12. The rail includes upper and lower races 44, 46 each terminating in a lip 48, 50 respectively projecting towards the horizontal center line of the bearing. The rail also includes a longitudinal, open-ended slot 52. When the bearing retainer 54 is molded it is molded flat as shown in FIG. 4. It may be noted the cost of molding the retainer in its assembled shape would be extremely high as compared to molding it flat.

In the molded but unassembled shape the retainer has two halves 56 interconnected at spaced intervals by webs 58 and provided with ball receiving apertures 60. Each half is provided with a longitudinal stiffening rib 62 which at the ball receiving aperture 60 extends inwardly to form ball engaging fingers preventing the ball from passing through the aperture. The interconnecting webs 58 permit the two halves to be flexed to the assembled position. When the retainer is molded it includes a longitudinally extending leg 64 which is received in the slot 52 in rail 42 while each half of the retainer is flexed into a Y shape (when viewed from the end) until the retainer with the balls in the pockets 60 can be slipped into the assembled position shown in FIG. 1. When the retainer is assembled into the rail, the retainer is captured in the rail. Thus, the leg 64 is captured in slot 52 while the longitudinal edges in each retainer half (each half being an arm of the Y shape) are captured in the corner between the race and lip 48 or 50 as the case may be. Thus, the balls are held in position by the retainer and do not rely on an opposing race to keep the ball in place.

The rear cross member 14 of the carrier is a molded part which includes the intermediate race member 66 having upper and lower races 68, 70 complimentary to the upper and lower races 44, 46 on the rail 42. It will be apparent on inspection of FIG. 1 that the intermediate race member 66 can be withdrawn in the direction of arrow C. When the intermediate race member 66 is withdrawn the retainer keeps the balls in place. The intermediate race member can be reinserted between the upper and lower balls by simply reversing the removal action. When the bearing is assembled the intermediate race member can be loaded upwardly or downwardly and still run on balls. This contributes substantially to silky operation of the microfiche carrier. This bearing retainer, as in the case of the other, is retained in the rail simply by turning a screw 72 into each end of the slot 52 in the rail. It may be noted that the webs 58 which interconnect the two halves of the retainer permit the retainer to be flexed and yet afford some resistance to flexure which simplifies the assembly operation. Once the retainer is assembled it is captured in the rail and it can only be removed endwise.

The spacing of the balls can be varied to meet the load requirements by changing the mold. The retainer should be shorter than the rail so it can move along the rail rather than forcing the ball to skid against the retainer. If the retainer hits the end of its travel, the ball will have to skid and the high lubricity of the ball ensures ease of operation. Normally, with the retainer length about one-half the length of the rail the retainer "centers" itself so it will not hit either end of travel in normal operation.

We claim:

1. A ball bearing assembly comprising, opposed linear bearing members each including a race, balls between the races, a retainer mounted in one bearing member and having apertures receiving balls and operative to retain the balls relative to the associated race when the other bearing member is moved away from the balls, said retainer having a longitudinal edge projecting into a longitudinal slot in said one member, said slot extending to the end of said one member, the edge of said retainer being mounted into the slot from the end of the member, means mounted in the end of the slot to prevent exit of the retainer, said one member having two races disposed as upper and lower races, said slot being located between the upper and lower races, said retainer having a shape when viewed from the end generally in the form of a Y, the leg of the Y being said edge projecting into said slot and each of the arms of the Y being a retainer retaining balls to the associated race, said other bearing member projecting between the upper and lower races and balls and having upper and lower races engageable with the upper and lower balls so the bearing assembly can accommodate upward or downward loading of said other bearing member, said other bearing member being removable from the assembly by moving it away from said one bearing member generally in a horizontal plane.

2. A ball bearing assembly according to claim 1 in which each of the upper and lower races of said one member have a longitudinal shoulder facing the other and the outer edge of each arm of the Y-shaped retainer is engagable with the associated shoulder whereby the retainer is captures in said one member.

3. A ball bearing assembly comprising, opposed linear bearing members each including a race, balls between the races, a retainer slideably mounted in one bearing member, said retainer being shorter than said one bearing member and having apertures receiving balls and operative to retain the balls relative to the associated race when the other bearing member is removed from the balls, said other bearing member being removable in a direction transverse the linear motion, said retainer being mounted in a slot which extends to the end of said one member and the retainer edge is mounted into the slot from the end of the member, means mounted in the end of the slot to prevent exit of the retainer, both longitudinal edges of the retainer being engaged by said one member, said one member having two generally parallel slots which are horizontally and vertically spaced and the retainer extending across the race while its edges project into said slots, said other bearing member being supported by the balls when loaded towards said one member but being freely movable away from said one member.

* * * * *